(No Model.)
G. KRAISS.
PRESSURE REGULATING VALVE.
No. 468,915. Patented Feb. 16, 1892.
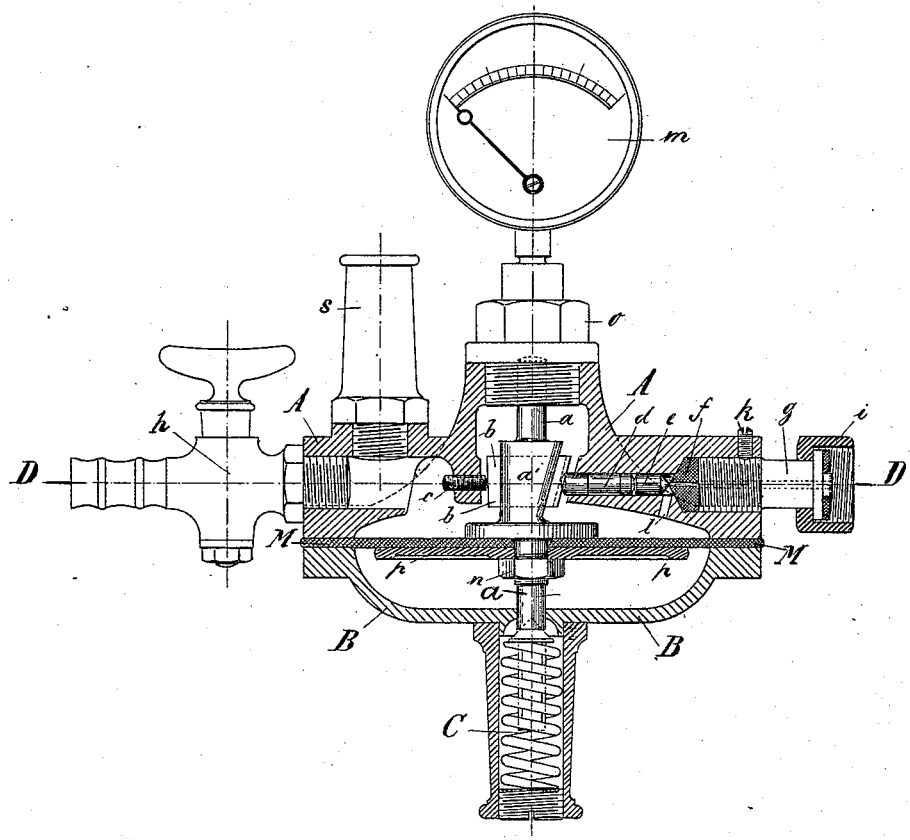
Fig. 1.
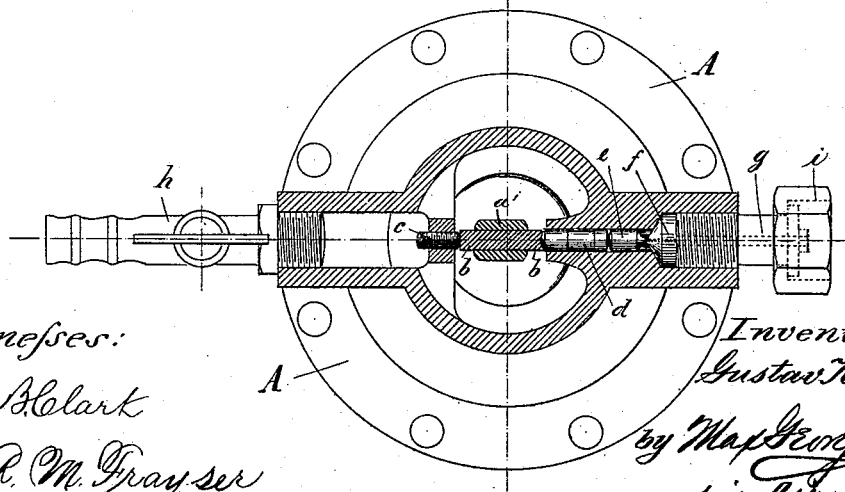
Fig. 2. Section DD.
Witnesses:
E. B. Clark
M. R. M. Frayser
Inventor:
Gustav Kraiss,
by Max Georgii
his Attorney.

UNITED STATES PATENT OFFICE.

GUSTAV KRAISS, OF STUTTGART, GERMANY.

PRESSURE-REGULATING VALVE.

SPECIFICATION forming part of Letters Patent No. 468,915, dated February 16, 1892.

Application filed June 30, 1891. Serial No. 397,977. (No model.)

*To all whom it may concern:*

Be it known that I, GUSTAV KRAISS, a subject of the King of Würtemberg, residing at Stuttgart, Würtemberg, Empire of Germany, have invented a new and useful Improvement in Pressure-Regulating Valves, of which the following is a specification.

Nearly all forms of pressure-regulating valves are subject to the disadvantage of becoming leaky even after a short period of use, so as to require a considerable pressure upon the diaphragm-plate to effect a complete closure of the valve. It consequently becomes extremely difficult and even impossible in some cases to effect a decrease of pressure, say, from one hundred atmospheres to one-twentieth atmosphere. Most of the valve arrangements heretofore employed are objectionable, moreover, in that the valve opening and closing mechanism operates too slowly by reason of the inadequate and complicated arrangement of the various parts—that is to say, far greater differences of pressure than those calculated are required to open or close the valve, resulting in a continual want of uniformity in the decrease of pressure. The leakage is generally due to the fact that the valve, sliding within a sleeve, is actuated by an incline either directly acting against the same or reciprocating vertically upon its end surface or by a rod inclined to the axis of the valve. Now, inasmuch as the valve-plug should easily slide within its sleeve, the latter is always made somewhat though slightly larger, and by the continual opening and closing is constantly increased in bore. The reciprocation of the inclined surface or rod tends to press the valve against one side at the lower end of the sleeve and against the opposite side at the upper end, the consequence being a small sliding motion of the valve-plug in the valve-seat, which, no matter how small, suffices to rapidly adduce leakage. A further disadvantage, consisting in the retarded working of the valve, and consequently a want of uniformity in the decrease of pressure, is due to the fact that the sliding piece, beveled at one side and which closes and opens the valve-plug by the reciprocation of its inclined or beveled surface, cannot move in the direction of the valve, and hence produces a great amount of friction, which must be overcome before the movement of the valve takes place.

My improvement is designed to overcome both disadvantages and to produce a pressure-regulating valve which will respond to the slightest variation of pressure and in which the valve will always be tightly closed.

In the drawings, Figures 1 and 2 represent a vertical and a horizontal section, respectively, the plane of section passing through the axis of the valve.

Like most valves of this class my device consists of two sections A and B, between which the diaphragm M is clamped. The arrangement of the pressure-regulating casing C, exhaust-cock $h$, safety-valve $s$, and manometer $m$ is also well known.

The novelty of my valve resides in the mechanism for opening and closing the valve proper and inducing the spontaneous action of the same due to reducing the friction of the working parts to a minimum.

The opening and closing action of the valve-plug $e$, acting in conjunction with the valve-seat $f$, is effected as follows: A steel wedge $b$ is mounted in the enlarged portion $a'$ of the guide-rod $a$ and adapted to slide in the direction of the valve-plugs, the said rod $a$ being attached to the diaphragm M by means of nut $n$ and supporting-plate $p$. The wedge $b$ with one considerably-inclined side impinges against a small elongated rod $d$, which bears against the valve-plug $e$, and upon its diametrically-opposite side it bears against a set or counter screw $c$, whose axis coincides with that of the valve-plug $e$ and the rod $d$ and which serves to regulate the lateral displacement of the wedge $b$. When the pressure-regulating valve is connected with the receiver of high-pressure gas by means of the union $i$ and the connecting-piece $g$, which secures the valve-seat $f$ in place and is held against disengagement by a clamp-screw $k$, the pressure from the receiver, acting upon the valve-plug $e$, forces the same back, together with the rod $d$, until the tension of the gas entering through port $l$ into the space between section A and the diaphragm M forces the said diaphragm, together with guide-rod $a$ and the sliding wedge $b$, downward, and the latter forces the valve-plug against the valve-seat—i. e., shuts the valve. The pressure upon the wedge b thus arising is taken up directly by the screw c, arranged directly opposite the valve e, so that the friction produced is reduced to a minimum and the least decrease in tension in the section A will cause the diaphragm M and wedge b to rise and the valve will again be opened.

By arranging the parts so that the wedge b does not act directly on the valve-plug e, but upon the intermediate pressure-rod d, I obtain the advantage of causing the valve-plug to be forced accurately in the direction of its longitudinal axis, inasmuch as the strains caused by the inclined wedge-surface and acting at right angles to the axis of the valve are taken up by the pressure-rod d and not transferred to the valve-plug e. The wear in the valve-seat which occurs in other valve constructions is thereby avoided. When it is considered that the opening in the valve-seat has a diameter of .06 to .08 millimeters and seldom exceeds one millimeter, it is manifest that the slightest frictional motion of the valve-plug in the valve-seat will produce an increase in the sealing-surface, which often amounts to three, four, and even more times the original size, and consequently requires three, four, and more times the original pressure upon the valve-plug to cause the same to close tightly. The sensitiveness of the pressure-regulating valve is hence considerably less and action under variations of pressure not spontaneous, as required, but gradual.

The guide-rod a, supporting the wedge b, is guided in the manometer-nut o at the top and in the bottom of the lower section B, and the guides may be made very thin to cause little friction, because the pressure of the valve in every position of the guide-pieces is not taken up by the latter, but directly by the wedge b and the set-screw c. All sliding parts may therefore be made exceedingly frail, and the friction consequently reduced to a minimum.

What I claim, and desire to secure by Letters Patent, is—

1. In a pressure-regulating valve, the combination, with the valve-casing and the inlet-valve seat, of a diaphragm, a guide-rod secured to the diaphragm, a wedge adapted to slide transversely in the guide-rod for the purpose of adjustment, and means between the wedge and the valve-seat for closing the valve, substantially as set forth.

2. In a pressure-regulating valve, the combination, with the valve-casing and the inlet-valve seat, of a diaphragm, a guide-rod secured to the diaphragm, a wedge adapted to slide transversely in the guide-rod, a counter-screw, as c, for adjusting said wedge, and means between the wedge and the valve-seat for closing the valve, substantially as set forth.

3. In a pressure-regulating valve, the combination, with the valve-seat, of a valve-plug, a pressure-rod, as d, a wedge adapted to bear against the end of the pressure-rod, and means for moving said wedge transversely of the pressure-rod, substantially as set forth.

In testimony whereof I have signed this specification in the presence of three subscribing witnesses.

GUSTAV KRAISS.

Witnesses:
 AUGUST B. DRANTZ,
 JUL. GERLACH,
 I. LEYPOLDTS NACHFOLGER.